(12) United States Patent
Magro

(10) Patent No.: US 8,434,432 B2
(45) Date of Patent: May 7, 2013

(54) COOLING SYSTEM FOR INTERNAL COMBUSTION ENGINES

(75) Inventor: Lorenzo Magro, Turin (IT)

(73) Assignee: GM Global Technology Operations LLC, Detroit, MI (US)

(*) Notice: Subject to any disclaimer, the term of this patent is extended or adjusted under 35 U.S.C. 154(b) by 243 days.

(21) Appl. No.: 12/877,912

(22) Filed: Sep. 8, 2010

(65) Prior Publication Data

US 2011/0107983 A1 May 12, 2011

(30) Foreign Application Priority Data

Sep. 9, 2009 (GB) .................................. 0915744.7

(51) Int. Cl.
*F01P 7/14* (2006.01)
(52) U.S. Cl.
USPC ........................................ 123/41.1; 123/41.29
(58) Field of Classification Search ................ 123/41.1, 123/41.01, 41.12, 41.05, 568.12, 568.11, 123/41.29, 41.44, 41.09
See application file for complete search history.

(56) References Cited

U.S. PATENT DOCUMENTS

| 4,055,158 | A | | 10/1977 | Marsee |
| 5,617,726 | A | * | 4/1997 | Sheridan et al. ............ 60/605.2 |
| 5,924,286 | A | * | 7/1999 | Kapich ........................... 60/608 |
| 6,826,903 | B2 | | 12/2004 | Yahata et al. |
| 7,267,086 | B2 | * | 9/2007 | Allen et al. ................. 123/41.44 |
| 7,299,771 | B2 | | 11/2007 | Wei et al. |
| 7,451,748 | B2 | * | 11/2008 | Nigoro et al. ............. 123/568.12 |
| 7,464,700 | B2 | | 12/2008 | Kolb |
| 2002/0195067 | A1 | * | 12/2002 | Murakami et al. ........... 123/41.1 |
| 2006/0157002 | A1 | * | 7/2006 | Pfeffinger et al. ......... 123/41.29 |
| 2006/0185626 | A1 | * | 8/2006 | Allen et al. ................. 123/41.12 |
| 2007/0028902 | A1 | * | 2/2007 | Nigoro et al. ............. 123/568.12 |
| 2007/0079774 | A1 | * | 4/2007 | Heldberg ..................... 123/41.1 |
| 2007/0157893 | A1 | * | 7/2007 | Wei et al. .................. 123/41.08 |
| 2007/0277523 | A1 | * | 12/2007 | Muller et al. .................... 60/599 |
| 2008/0257526 | A1 | | 10/2008 | Le Lievre et al. |

FOREIGN PATENT DOCUMENTS

| AT | 7762 U1 | 8/2005 |
| DE | 10146313 A1 | 4/2003 |
| DE | 102006048527 A1 | 4/2008 |
| EP | 1295740 A1 | 3/2003 |
| GB | 2383409 A | 6/2003 |
| GB | 2394537 A | 4/2004 |
| JP | 2007263034 A | 10/2007 |
| WO | 2009085055 A1 | 7/2009 |

* cited by examiner

*Primary Examiner* — Noah Kamen
*Assistant Examiner* — Long T Tran
(74) *Attorney, Agent, or Firm* — Ingrassia Fisher & Lorenz, P.C.

(57) ABSTRACT

A cooling system is provided for an internal combustion engine that includes, but is not limited to an engine coolant circuit having a coolant inlet and a coolant outlet, a radiator having an inlet and an outlet, a first pipeline for hydraulically connecting the radiator outlet and the engine coolant inlet, a second pipeline for hydraulically connecting the engine coolant outlet to the radiator inlet, a coolant pump located in the first pipeline for moving a coolant towards the engine coolant inlet, a thermostatic valve located in the first pipeline between the primary pump and the radiator outlet, for closing or at least partially opening the passageway, a bypass pipeline for hydraulically connecting an intermediate point of the second pipeline to an intermediate point of the first pipeline, the latter being located between the thermostatic valve and the radiator outlet, an exhaust gas recirculation cooler located in the bypass pipeline, an auxiliary coolant pump located in the bypass pipeline, and a controlling for controlling the auxiliary coolant pump.

13 Claims, 3 Drawing Sheets

COOLING SYSTEM FOR INTERNAL COMBUSTION ENGINES

CROSS-REFERENCE TO RELATED APPLICATION

This application claims priority to British Patent Application No. 0915744.7, filed Sep. 9, 2009, which is incorporated herein by reference in its entirety.

TECHNICAL FIELD

The present invention relates to cooling systems for internal combustion engines provided with an exhaust gas recirculation (EGR) system.

BACKGROUND

Internal combustion engines always comprise a cooling system for thermal management. The cooling system comprises a plurality of hydraulically interconnected conducts, which are comprised in the engine crankcase, engine cylinder block and engine cylinder head, to thereby defining an engine coolant circuit.

The engine coolant circuit is hydraulically connected to a coolant pump for circulating a coolant therein, such that the heat generated by engine components during normal operation is transferred by conduction and/or convection to the coolant. The engine coolant circuit is further hydraulically connected to a radiator for removing heat from the coolant. The coolant can be distilled water or preferably a mixture of water, antifreeze and other additives, which are suitable for increasing the cooling efficiency.

Some internal combustion engines, typically Diesel engines, comprise an exhaust gas recirculation (EGR) system, by means of which part of exhaust gas exiting the engine exhaust manifold is channeled back into the engine intake manifold, particularly for reducing NO emission. For achieving this result, the exhaust gas must be cooled before entering the engine intake manifold. The exhaust gas is conventionally cooled by means of one or more EGR coolers.

A so-called EGR cooler is constructed as a heat exchanger which is in hydraulic communication with the exhaust manifold and the intake manifold, such that the heat of exhaust gas is transferred by conduction and/or convection to a coolant which circulates in the heat ex-changer. In several realizations, the EGR cooler is comprised in an auxiliary cooling system, which is fully separated by the engine cooling system, and thereby comprises auxiliary radiator and auxiliary coolant pump. In other realizations, the EGR cooler is comprised in the engine cooling system, to thereby using a single radiator for both the engine coolant circuit and the EGR cooler, without any increased cost on the vehicle. A realization of the latter kind provides the cooling system which is described hereinafter.

As usual, the cooling system comprises an engine coolant circuit and a radiator. The radiator outlet communicates with the inlet of engine coolant circuit via a first pipeline, while the outlet of engine coolant circuit communicates with the radiator inlet via a second pipeline, to thereby closing the circuit. A coolant pump is located in the first pipeline, for moving the cool-ant towards the inlet of engine coolant circuit. The cooling system further comprises a bypass pipeline and a thermostatic valve. The bypass pipeline hydraulically connects the second pipeline directly to the first pipeline.

The thermostatic valve is located in the first pipeline, for closing the passageway when the coolant temperature in the engine is below a predetermined value, to thereby preventing the coolant to flow through the radiator. The thermostatic valve is useful for speeding up the engine warm-up and, during normal operation, for maintaining the coolant at a predetermined temperature.

Finally, the cooling system comprises an EGR cooler located in the bypass pipeline. When the thermostatic valve is open, part of the coolant from the engine coolant circuit is routed through the bypass pipeline, to there-by cooling the exhaust gas in the EGR cooler. Since the coolant in the engine coolant circuit can reach temperatures of about 95-100° C., it follows that the cooling system can not provide a strong EGR cooling.

By contrast, several tests have shown that a strong EGR cooling is useful for obtain low $NO_x$ emission. Moreover, when the thermostatic valve is closed in order to speed up the engine warm-up, the coolant does not flow through the radiator and it all flows through the EGR cooler, reaching in short time 95-100° C. Therefore, the cooling system can not perform the strong EGR cooling during the engine warm up. By contrast, it is generally very important to reduce the NO emission at the beginning of the emission cycle.

At least one aim of the present invention is to improve the described cooling system of the prior art, to thereby overcoming the above mentioned drawbacks. Another aim of the present invention is to meet the goal with a rather simple, rational and inexpensive solution. In addition, other aims, desirable features, and characteristics will become apparent from the subsequent summary and detailed description, and the appended claims, taken in conjunction with the accompanying drawings and this background.

SUMMARY

In accordance with an embodiment of the invention, a cooling system is provided for an internal combustion engine comprising an engine coolant circuit having a coolant inlet and a coolant outlet, a radiator having an inlet and an outlet, a first pipeline for hydraulically connecting the radiator out-let to the engine coolant inlet, a second pipeline for hydraulically connecting the engine cool-ant outlet to the radiator inlet, a coolant pump located in the first pipeline for pumping a cool-ant towards the engine coolant inlet, a thermostatic valve located in the first pipeline between the coolant pump and the radiator outlet, for closing or at least partially opening the hydraulic connection between radiator outlet and engine coolant inlet, a bypass pipeline for hydraulically connecting the second pipe-line directly to the first pipeline, and an exhaust gas recirculation (EGR) cooler located in the bypass pipeline.

A bypass pipeline hydraulically connects the second pipeline to an intermediate point of the first pipe-line which is located between the thermostatic valve and radiator outlet, and that the cooling system further comprises an auxiliary coolant pump, preferably an electric pump, which is located in the bypass pipeline, and a controller or controlling means for controlling said auxiliary coolant pump.

During the engine warm-up, when the thermostatic valve is fully closed, the auxiliary coolant pump can be switched on, such that the coolant in the radiator (that is generally at ambient temperature) is forced to flow in the bypass pipeline, to thereby obtaining a strong EGR cooling at the beginning of the emission cycle, thanks to the very high temperature difference between engine and radiator coolant in this phase.

During normal operation, when the thermostatic valve is at least partially open, the auxiliary coolant pump is preferably still switched on, so that EGR can be strongly cooled because coolant in radiator is still colder than coolant in engine. In full load operations, the auxiliary coolant pump can be switched off so that the EGR cooler reach the engine coolant temperature and works like a parallel engine bypass. Alternatively, the auxiliary coolant pump can be switched on even during full load operations, so that part of the coolant from the radiator outlet is forced to flow countercurrent through the bypass pipeline and the EGR cooler. Since the coolant exiting the radiator is colder than coolant exiting the engine coolant circuit, a stronger EGR cooling and an improved NO reduction is obtained.

Through controlling the auxiliary pump operation, for example through regulating the timing of switching on and switching off and/or other operating parameters as the auxiliary pump velocity, is further possible to regulate the entity of EGR cooling in response of one or more engine operating parameters. The engine operating parameters involved can be for example engine load, engine speed, exhaust gas temperature, coolant temperature and many others. In this contest, the coolant temperature can be measured at the out-let of engine coolant circuit, the outlet of radiator, or at other suitable points of the cooling system.

Further objects, features and advantages of the present invention will be apparent from the detailed description of preferred embodiments that follows, when considered together with the accompanying drawings.

BRIEF DESCRIPTION OF THE DRAWINGS

The present invention will hereinafter be described in conjunction with the following drawing figures, wherein like numerals denote like elements.

FIG. 3 is the block diagram of FIG. 1 shown during the normal engine operation, with the auxiliary pump switched on.

DETAILED DESCRIPTION

Figure 1:
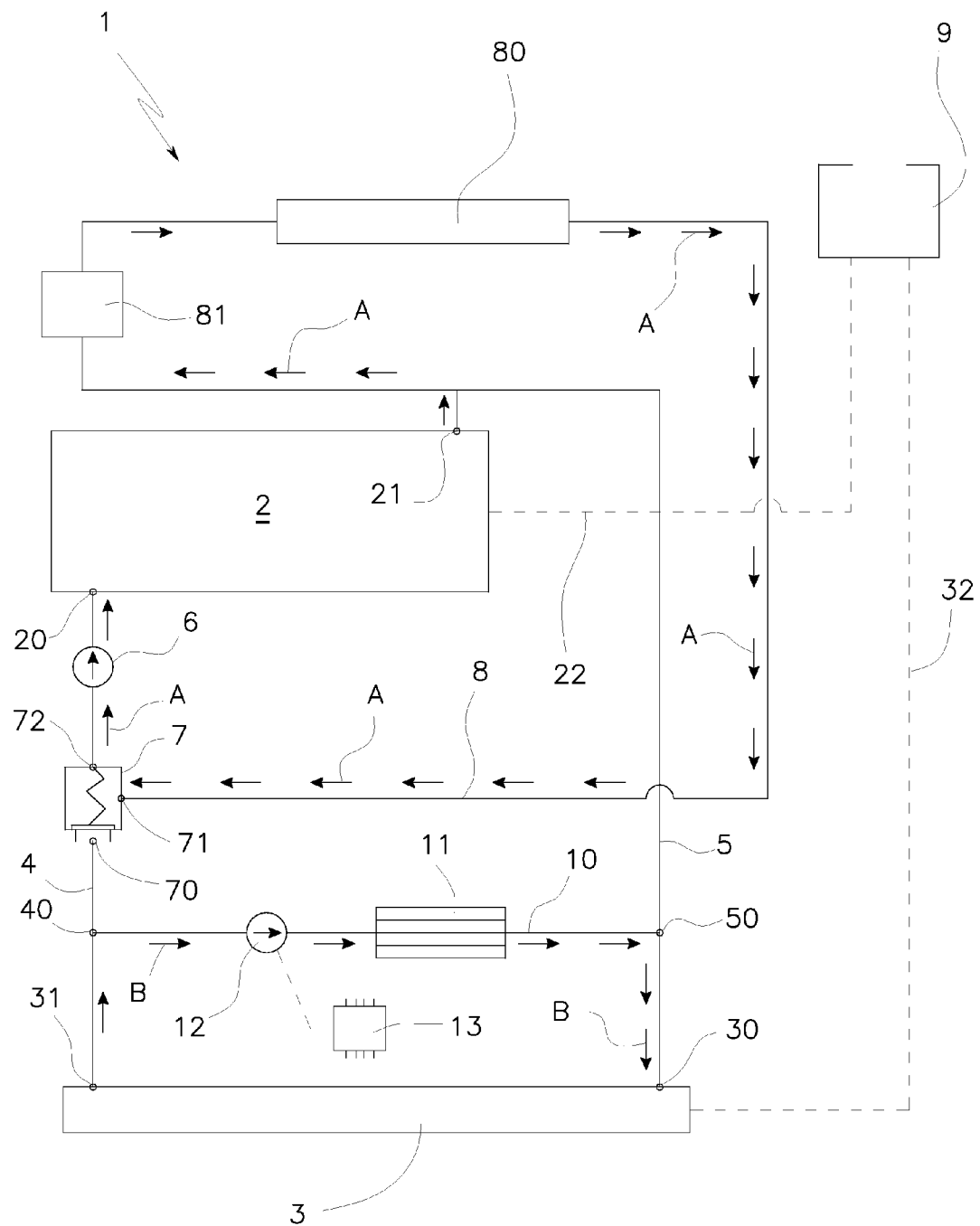
FIG. 1 is a block diagram of an internal combustion engine cooling system in accordance with an embodiment of the invention, shown during engine warm-up.

The following detailed description is merely exemplary in nature and is not intended to application and uses. Furthermore, there is no intention to be bound by any theory presented in the preceding background or summary or the following detailed description. The cooling system 1 comprises an engine coolant circuit which is globally labeled 2. The engine coolant circuit 2 comprises a plurality of hydraulically interconnected conducts, which are generally comprised in the engine crankcase, engine cylinder block and engine cylinder head. The engine coolant circuit 2 is per se known and therefore it is not described in further details. The engine coolant circuit 2 is provided with a coolant inlet 20 and a coolant outlet 21 for a liquid coolant to flow through said hydraulically interconnected conducts.

The coolant can be distilled water or preferably a mixture of water, antifreeze and other additives suitable for increasing cooling efficiency. The coolant can also be oil.

The cooling system 1 further comprises a radiator which is globally labeled 3. The radiator 3 is a heat exchanger wherein the heat of the coolant is generally transferred by conductive and/or conventional to environ-mental air. The radiator 3 is per se known and therefore it is not described in further details. The radiator 3 is provided with an inlet 30 and an outlet 31 for the coolant. The radiator outlet 31 hydraulically communicates with the engine coolant inlet 20 via a first pipeline 4, while the engine coolant outlet 21 hydraulically communicates with the radiator inlet 30 via a second pipeline 5, to thereby obtaining a closed hydraulic circuit. A primary coolant pump 6, preferably an engine driven pump, is located in the first pipeline 4, for moving the coolant towards the engine coolant inlet 20.

The cooling system 1 further comprises a coolant surge tank 9, which is hydraulically connected with both engine coolant circuit 2 and radiator 3, by means of the pipelines 22 and 32 respectively, for cool-ant degassing.

The cooling system 1 further comprises a bypass pipeline 10, which hydraulically connects an intermediate point 50 of the second pipeline 5 directly to an intermediate point 40 of the first pipeline 4. The intermediate point 50 is located between the engine coolant outlet 21 and the radiator inlet 30, while the intermediate point 40 is located between the radiator outlet 31 and the primary coolant pump 6. An EGR cooler 11 is located in the bypass pipeline 10, for cooling the exhaust gas which is route back from engine exhaust manifold to engine intake manifold.

The cooling system 1 further comprises a thermostatic valve 7 which is located in the first pipeline 4 between the intermediate point 40 and the primary coolant pump 6. The thermostatic valve 7 is a three-port valve having two inlets 70 and 71, and a single outlet 72. The first inlet 70 is hydraulically connected to the radiator outlet 31. The outlet 72 is hydraulically connected to the inlet of primary coolant pump 6. The second outlet 71 is hydraulically connected to the engine coolant outlet 21 via a third separated pipeline 8, which includes in series an oil cooler 81 and a heater 80 for a vehicle compartment, typically for the vehicle passenger cabin.

The thermostatic valve 7 is arranged for selectively opening, closing, or partially obstructing the first inlet 70 and the second inlet 71, in response of the coolant temperature in the engine coolant circuit 2. The thermostatic valve 7 can be an automatic valve which moves in response of a direct mechanical temperature control, or can be an electric valve controlled by a microprocessor based controller using sensors for measuring the coolant temperature.

When the coolant temperature in the engine coolant circuit 2 is below a predetermined threshold, the thermostatic valve 7 fully closes the first inlet 70, for preventing the coolant from the radiator 3 to reach the engine coolant circuit 2. In this condition, engine coolant circuit 2 and radiator 3 are substantially located in fully separated hydraulic routes (See, FIG. 1).

As a matter of fact, the engine route comprises the third pipeline 8, the thermostatic valve 7, and the portion of the first pipelines 4 which is comprised between the thermostatic valve outlet 72 and engine coolant inlet 20. The radiator route comprises the portion of the first pipelines 4 which is comprised between the radiator outlet 31 and the intermediate point 40, the bypass pipeline 10, and the portion of the second pipelines 5 which is comprised between the intermediate point 50 and radiator inlet 31. As the coolant temperature rises, the thermostatic valve 7 gradually opens the first inlet 70, to thereby allowing the coolant from the radiator 3 to reach the engine coolant circuit 2.

According to an embodiment of the invention, an auxiliary coolant pump 12, preferably an electrical pump is located in the bypass pipeline 10, between the intermediate point 40 and the EGR cooler 11. The auxiliary coolant pump 12 operation is controlled by a microprocessor based controller 13, preferably the engine control unit (ECU). The controller 13 is suitable for sensing the position of the thermostatic valve 7 and for applying this parameter to control the auxiliary coolant pump 12.

The controller 13 is also connected to a plurality of sensors (not shown), for providing respective measures of a plurality of engine operating parameters. Such engine operating parameters can comprise for example engine load, engine speed, exhaust gas temperature, coolant temperature and many other. In this contest, the coolant temperature can be measured at the outlet 21 of engine coolant circuit 2, the outlet 31 of radiator 3, or at other suitable points of the cooling system.

A preferred operating mode for the cooling system 1 is described hereinafter. During engine warm-up, until the coolant temperature is below the predetermined threshold, the first inlet 70 of the thermostatic valve 7 is fully closed, and the primary coolant pump 6 is generally switched off. Eventually, the primary coolant pump 6 can be switched on during engine warm-up, such that the coolant circulates in the engine coolant circuit following the direction indicated by the arrows labeled A in FIG. 1.

As a matter of fact, the coolant from the primary coolant pump 6 flows through the engine coolant circuit 2, then is routed through the third pipeline 8 for flowing through oil cooler 81 and cabin heater 80, and finally returns to the primary coolant pump 6 via the thermostatic valve 7. Whether the primary coolant pump 6 is switched on or off, the coolant from the engine coolant circuit 2 does not flow through the radiator 3, to thereby speeding up the engine warm-up.

During engine warm-up, until the thermostatic valve 7 is fully closed, the controller 13 switches the auxiliary coolant pump 12 on, such that the coolant present in the radiator 3 circulates following the direction indicated by the arrows labeled B in FIG. 1. As a matter of fact, the coolant from the radiator 3 flows towards the intermediate point 40, then is routed through the bypass pipeline 10 towards the intermediate point 50, and finally returns into the radiator 3. Therefore, the EGR cooler 11 is provided with the coolant exiting the radiator 3 (which generally is at ambient temperature), to thereby achieving a strong EGR cooling.

Figure 2:
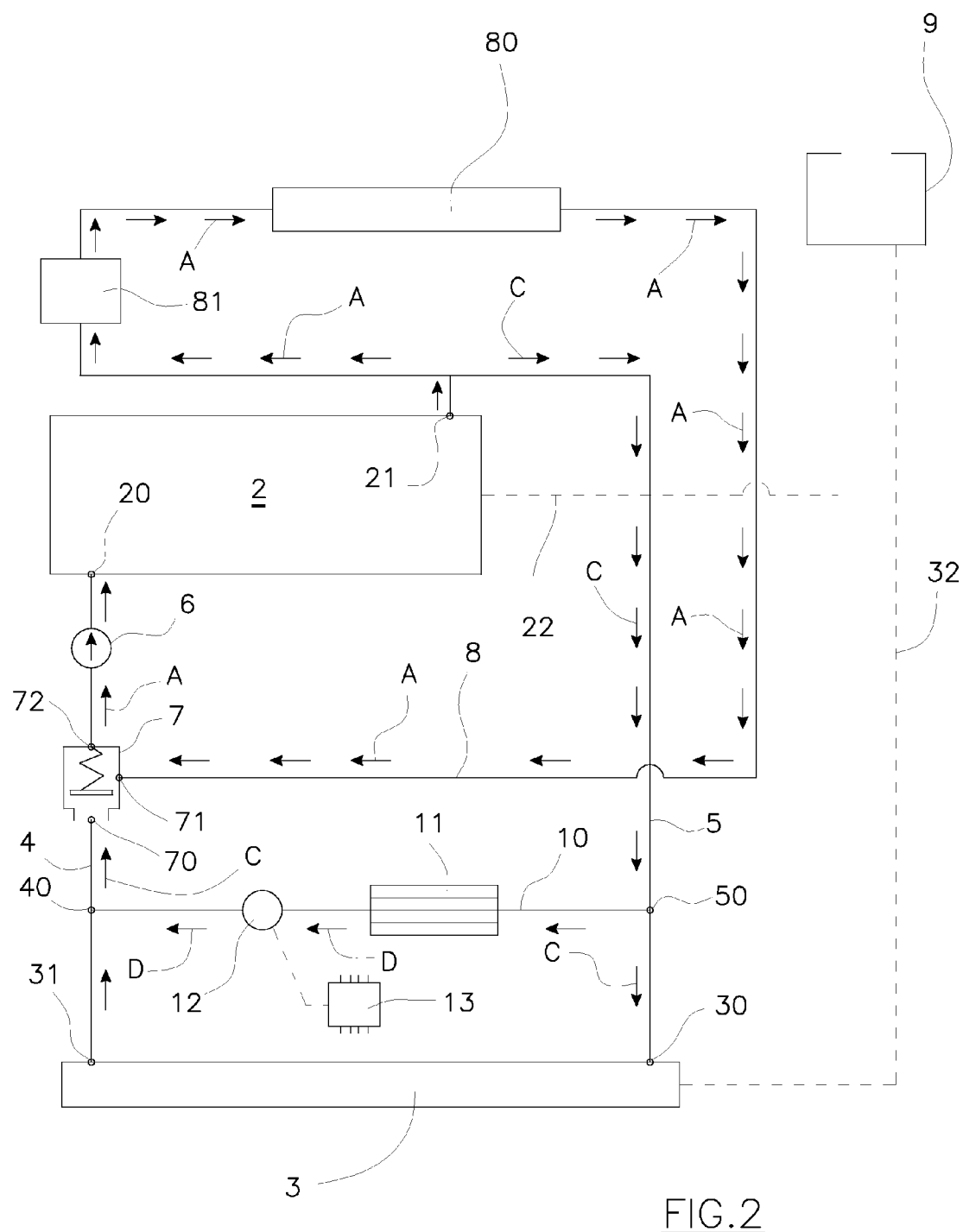
FIG. 2 is the block diagram of FIG. 1 shown during the normal engine operation, with the auxiliary pump switched off.

During normal operation, when the coolant temperature rises above the threshold, the thermostatic valve 7 opens the first inlet 70, and the primary coolant pump 6 is definitely switched on, such that the cool-ant starts to circulate in the cooling system also in the direction labeled C in FIG. 2. As a matter of fact, from the engine coolant outlet 21, the coolant starts to flow also through the second pipeline 5 towards the radiator 3, to thereby being cooled. The coolant from the radiator 3 flows into the thermostatic valve 7, wherein it mixes with the coolant coming from the cabin heater 80 be-fore reaching the engine coolant circuit 2.

Controlling the obstructing degree of the first inlet 70 in response of the coolant temperature in the engine coolant circuit 2, the thermostatic valve 7 is able to choke the coolant flow coming from the radiator 3, to thereby maintaining the coolant entering the engine coolant circuit 2 at a predetermined operating temperature.

During normal operation, when the thermostatic valve 7 is partially or fully open, the controller 13 can switch the auxiliary coolant pump 12 off, such that part of coolant from the engine coolant circuit 2 is routed through the bypass pipeline 10, for flowing in the direction indicated by the arrows labeled D in FIG. 2, from the intermediate point 50 towards intermediate point 40. In this way, the EGR cooler 11 is provided with the coolant exiting the engine coolant circuit 2 (which generally is at about 95° C.).

Figure 3:
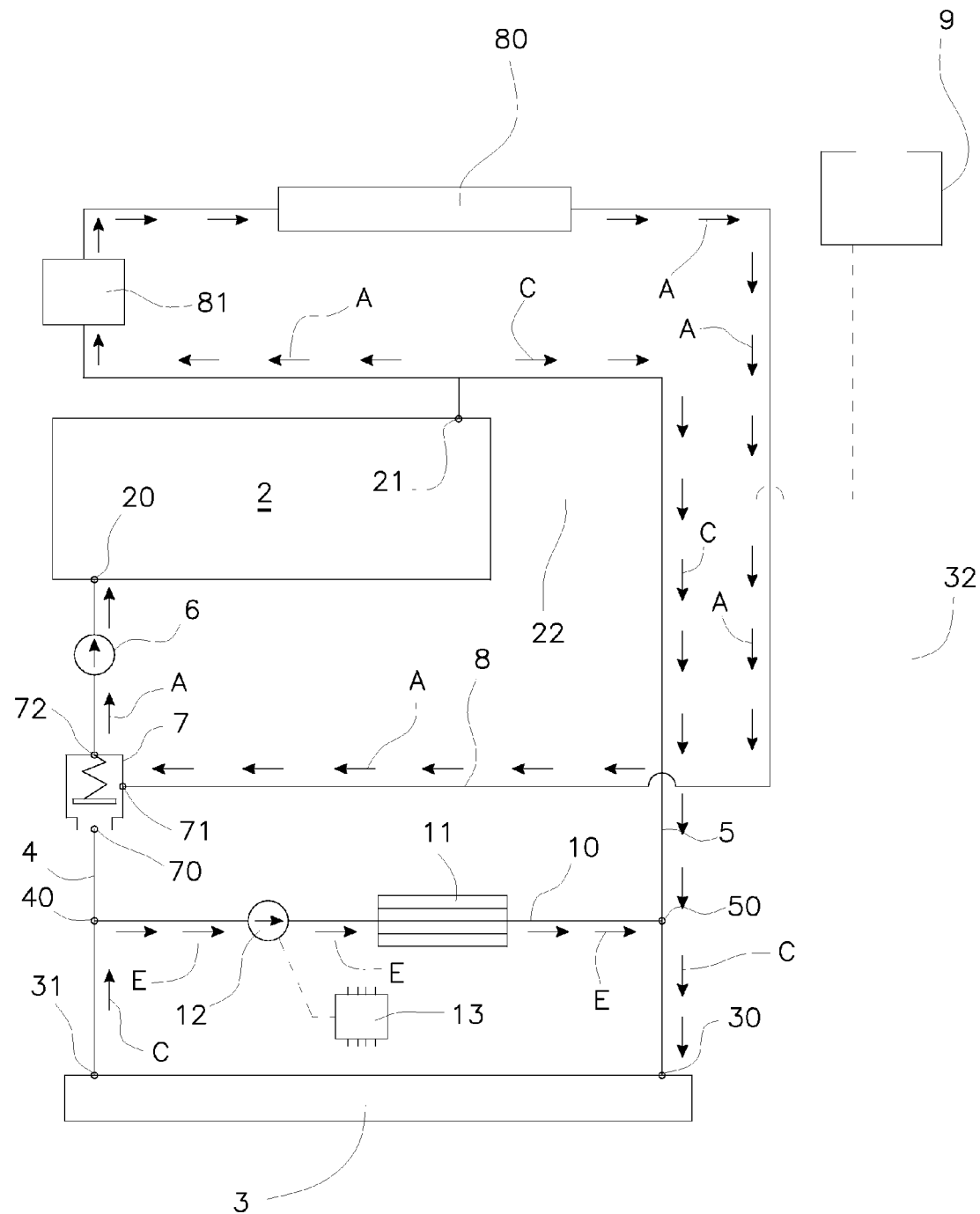

Alternatively, the controller 13 can keep the auxiliary coolant pump 12 switched on also during normal operation, when the thermostatic valve is partially or fully open. In this way (See, FIG. 3), part of the coolant from the radiator outlet 31 is forced by the auxiliary coolant pump 12 to flows countercurrent through the bypass pipeline 10, from the intermediate point 40 to-wards the intermediate point 50, as indicated by the arrows labeled E in FIG. 3. Since the temperature of coolant exiting the radiator 3 is less than the temperature of coolant exiting the engine coolant circuit 2, the ERG cooler is provided with colder coolant, to thereby obtaining a stronger EGR cooling and an improved $NO_x$ reduction compared to when the auxiliary coolant pump 12 is switched off. The controller 13 can also regulate the auxiliary coolant pump operation, for example its velocity and/or the timing of switching on and switching off, in response of the engine operating parameter measured by the sensor, in order to accordingly regulate the entity of the EGR cooler 11.

While the present invention has been described with respect to certain preferred embodiments and particular applications, it is under-stood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims. The foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A cooling system for an internal combustion engine, comprising:
    an engine coolant circuit having an engine coolant circuit inlet and an engine circuit coolant circuit outlet;
    a radiator having a radiator inlet and a radiator outlet;
    a first pipeline that hydraulically connects the radiator outlet and the engine coolant circuit inlet;
    a second pipeline that hydraulically connects the engine coolant circuit outlet and radiator inlet;
    a coolant pump located in the first pipeline and that pumps a coolant to the engine coolant circuit inlet;
    a thermostatic valve located in the first pipeline and between the coolant pump and the radiator outlet and that at least partially opens a connection between radiator outlet and the engine coolant circuit inlet;
    a bypass pipeline that hydraulically connects the second pipeline to the first pipeline; and
    an exhaust gas recirculation (EGR) cooler located in the bypass pipeline,
    wherein the bypass pipeline hydraulically connects the second pipeline to an intermediate point of the first pipeline that is located between the thermostatic valve and the radiator outlet, and
    the cooling system further comprises an auxiliary coolant pump located in the bypass pipeline upstream from the EGR cooler, and a controller controls said auxiliary coolant pump.

2. The cooling system according to claim 1, wherein the auxiliary coolant pump, when activated, pumps at least part of the coolant from the radiator outlet through the bypass pipeline towards the second pipeline to thereby pass through the EGR cooler.

3. The cooling system according to claim 1, wherein the bypass pipeline, when the auxiliary coolant pump is switched off and the coolant flows in the second pipeline from the engine coolant circuit outlet towards the radiator inlet, routes at least part of the coolant from the engine coolant circuit outlet through the bypass pipeline towards the first pipeline, thereby passing through the EGR cooler.

4. The cooling system according to claim 1, wherein the controller switches on the auxiliary coolant pump, at least when the thermostatic valve closes the connection between radiator outlet and engine coolant circuit inlet.

5. The cooling system according to claim 1, wherein the controller switches on the auxiliary coolant pump, when the thermostatic valve opens at least partially the connection between radiator outlet and the engine coolant circuit inlet.

6. The cooling system according to claim 1, wherein the controller switches off the auxiliary coolant pump, when the thermostatic valve opens at least partially the connection between radiator outlet and engine coolant circuit inlet.

7. The cooling system according to claim 1, wherein the controller controls operation of the auxiliary coolant pump that is at least based on at least one engine operating parameter.

8. The cooling system according to claim 7, wherein said at least one engine operating parameter is an engine speed.

9. The cooling system according to claim 7, wherein said at least one engine operating parameter is an engine load.

10. The cooling system according to claim 7, wherein said at least one engine operating parameter is an exhaust gas temperature.

11. The cooling system according to claim 7, wherein said at least one engine operating parameter is a coolant temperature.

12. The cooling system according to claim 7, further comprising a sensor in operative communication with the controller and that measures said at least one engine operating parameter.

13. The cooling system according to claim 1, wherein the thermostatic valve closes the connection between radiator outlet and engine coolant circuit inlet.

* * * * *